March 2, 1943. W. W. EVERTS 2,312,889
CENTRIFUGALLY OPERATED CLUTCH
Filed Oct. 22, 1941

Inventor
Walter W. Everts.
By B. P. Kilburne
Attorney

Patented Mar. 2, 1943

2,312,889

UNITED STATES PATENT OFFICE

2,312,889

CENTRIFUGALLY OPERATED CLUTCH

Walter W. Everts, Baltimore, Md., assignor of one-third to Abraham J. Fink and one-third to Enos S. Stockbridge, both of Baltimore, Md.

Application October 22, 1941, Serial No. 416,118

5 Claims. (Cl. 192—103)

My invention relates to centrifugally operated clutches.

An important object of the invention is to provide a clutch of the above-mentioned character, capable of producing variable speeds.

A further object of the invention is to provide cam-weights having contact faces provided with a slight eccentricity with relation to the circular group of coacting rollers, whereby the cam-weights will pass for a short distance only into the spaces between the pairs of rollers, permitting of the relative turning movement between the driving and driven units without jars or vibrations.

A further object of the invention is to provide a clutch of the above-mentioned character having cam-weights of a length for at least substantially the distance between the inner high points of the coacting rollers, whereby the cam-weights will pass over the rollers with a cam-like action, eliminating vibration, when the action of the load overcomes the action of centrifugal force upon the cam-weights.

A further object of the invention is to provide segmental cam-weights having limited spaces between their ends to permit of proper inward movements of the cam-weights but eliminating undue inward movement, thereby avoiding hammering action of the cam-weights upon the rollers.

A further object of the invention is to provide a clutch of the above-mentioned character which is strong, simple in construction, and compact.

Other objects and advantages of the invention will be apparent during the course of the following description.

Figure 1:
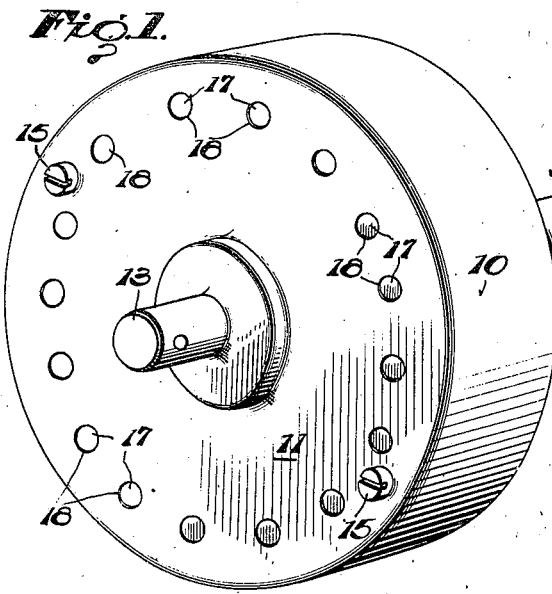
Figure 2:
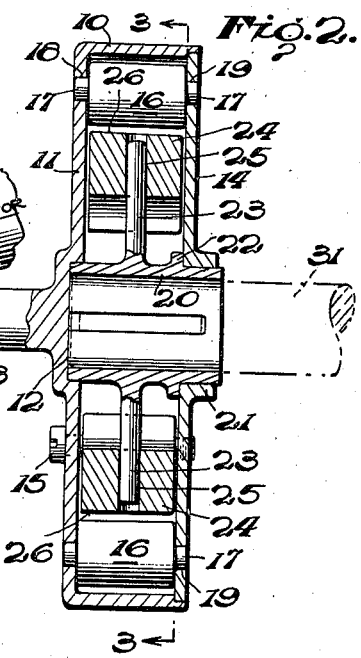
Figure 3:
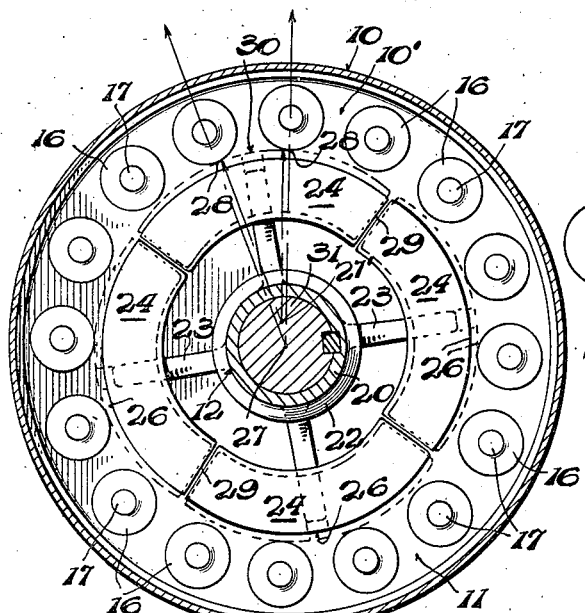
Figure 5:
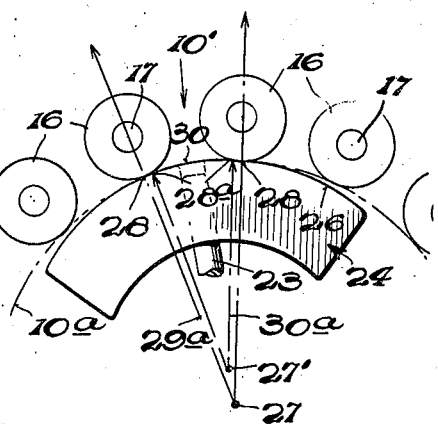
Figure 4:
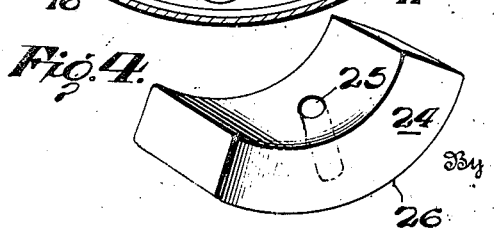

In the accompanying drawing forming a part of this application and in which like numerals are employed to designate like parts throughout the same, Figure 1 is a perspective view of a centrifugal clutch embodying my invention, Figure 2 is a central vertical section through the same, Figure 3 is an end elevation of the device, the face plate being removed, Figure 4 is a perspective view of one of the segmental cam-weights, and, Figure 5 is a diagrammatic view of a cam-weight and associated rollers.

In the drawing, wherein for the purpose of illustration is shown a preferred embodiment of my invention, the numeral 10 designates a cylindrical casing having a permanently closed head 11 provided with a bearing hub 12. This bearing hub has a shaft 13, preferably formed integral therewith and the shaft 13 is connected with the load. The open end of the casing 10 is covered by a removable head 14, held in place by screws or bolts 15. Arranged within the casing 10 is a circular group of equidistantly spaced rollers 16 having stub-shafts 17 rotatable within openings 18 and 19, as shown. These rollers provide spaces 16' between the same. The stub-shafts 17 have their centers arranged in a circle which is concentric with the periphery of the casing 10 whereby the circular group of rollers are concentric with the casing 10. The casing 10 and rollers 16 constitute a driven unit.

A driving unit is provided, in the form of a spider including a tubular hub 20, one end of which is rotatable within the hub bearing 12 and the other end of which is rotatable within a hub bearing 21. Endwise movement of the tubular bearing 20 is prevented by one end thereof engaging the hub bearing 12 while the tubular bearing has a radial flange 22, engaging the inner face of the head 14, adjacent the hub bearing 21. Any other suitable means may be employed for this purpose. The tubular hub bearing 20 has radial arms 23, rigidly secured thereto. While I have shown four of these radial arms any suitable number may be employed and there may be sets of radial arms disposed in different planes, with the arms in one set staggered with respect to the arms in the other set. The numeral 24 designates segmental cam-weights, corresponding in number to the radial arms 23 and having radial openings 25 slidably receiving the radial arms. These segmental cam-weights 24 are permanently free to slide upon the radial arms 23 and are hence permanently responsive to the action of centrifugal force. Each cam-weight has an outer circularly curved convex face 26. This circularly curved face 26 is eccentric with the center 27 and has a smaller radius than the circle which is tangent to the inner high points of the circular group of rollers. The point 27 is the center of the circle within which the centers of the rollers 16 are located and the center of the cylindrical casing 10. The curved face 26 is eccentric with respect to the circular group of rollers. By having the convex circularly curved face 26 eccentric with respect to the circular group of rollers a portion of the face 26 will project into the space between the adjacent pair of rollers 16. The segmental cam-weight 26 has a length which is at least as long as the distance between the inner high points 28 of the adjacent pair of rollers 16. It is preferred that the segmental cam-weights extend beyond these inner high points. The length of the segmental cam-weights is preferably such that there is a restricted space 29 between their ends, when they are in the outermost position, which will permit of the cam-weights moving inwardly so that the outer high point 30 of the cam-weight may pass from within the space 10' between the pair of rollers. When the segmental cam-weights move inwardly sufficiently so that their high points 30 move out of the spaces 10', they will pass over the rollers with a cam-like action. In the inner position, the cam-weights are held relatively close to the rollers by their ends contacting so that there will be no undue hammering action which might occur between the cam-weights and the rollers when the clutch is started.

The numeral 31 designates a shaft extending into the tubular hub 20 and keyed therein to drive the same. The shaft 31 may be driven by a motor. The shaft 31, spider, and segmental cam-weights constitute the driving unit.

The operation of the clutch is as follows:

When the shaft 31 is driven, this rotation is imparted to the hub 20 and radial arms 23 and segmental cam-weights 26. These segmental cam-weights move outwardly due to the action of centrifugal force, and their high points 30 enter the spaces 10' between the pairs of rollers 16. The inner ends of the spaces 10' between the pairs of rollers 16 terminate at the circle 10ª, which is tangent to the inner high points 28 of the circular group of rollers 16. If the action of centrifugal force upon the cam-weights overcomes the resistance of the load upon the shaft 13 of the driven unit then the driving and driven units will rotate as a unit. However, when the resistance of the load overcomes the action of centrifugal force upon the cam-weights the driving unit will turn with respect to the driven unit, whereby the cam-weights will travel over the circular group of rollers, in accordance with the extent that the load has overcome the action of centrifugal force upon the cam-weights. When each cam-weight 26 contacts with a pair of the rollers 16, the contact is made at points 28ª, which are adjacent to the inner high points 28. The radii 29ª of the rollers 16 pass through the center 27 and the center of the rollers and through the high points 28. The radii 30ª of the cam-weight 26 pass through the center 27' of the cam-weight and the points of contact 28ª. The center 27' is eccentric with respect to the center 27. It is thus apparent that the distances between the points of contact 28ª and the inner high points 28 will depend upon the difference in length between the radii 30ª and 29ª. As the length of the radii 30ª approach the length of the radii 29ª the points of contact 28ª approach the high points 28. It is desired that the points 28ª be adjacent to or very close to the high points 28, so that there will be a slight radial movement of the cam-weight as it travels over the rollers. While the face 26 of the cam-weight 24 is eccentric with respect to the circular group of rollers, this eccentricity is slight, so that the high point 30 of the face 26 will project for but a slight distance into the space 10', so that the points of contact 28ª will be close to the high points 28. The points of contact 28ª are so near the high points 28 that the points of contact are substantially at the high points. The cam-weights have a length for at least substantially the distance between the inner high points 28 of the pairs of rollers. Each cam-weight passes from one roller to the other with a cam-like action, eliminating sudden jars and vibrations, for the cam-weight always engages one roller 16 and will engage the next preceding roller before it disengages the next succeeding roller, the cam-weight also engaging a pair of the rollers at one time, only when the cam weight has its intermediate contacting part equally spaced between two rollers, and retaining such engagement when the driving and driven units turn together. When each cam-weight engages a pair of rollers 16 the engagement occurs at the points 28ª which are very close to the high points 28, as explained. When the clutch is at rest, the cam-weights move inwardly and their adjacent ends may meet. This limits the inward movement of the cam-weights which are retained in close relation to the rollers so that there will be no hammering or pounding action between the cam-weights and the rollers when the clutch starts up. The cam-weights preferably extend far beyond the high points 28 of the adjacent pair of rollers and may have a length to extend over four of the rollers, as shown. Further, by having the segmental cam-weights long their weight is increased and the action of centrifugal force upon them accordingly increased.

It is to be understood that the form of my invention herewith shown and described is to be taken as a preferred example of the same and that various changes in the shape, size, and arrangement of parts may be resorted to without departing from the spirit of my invention or the scope of the subjoined claims.

Having thus described my invention, what I claim is:

1. A centrifugal clutch comprising a rotary member, a circular group of pairs of spaced rollers mounted upon the rotary member, a second rotary member, radially movable cam-weights carried by the second rotary member, each cam-weight having a curved outer convex face which is eccentric with respect to the circular group of pairs of spaced rollers and has a radius less than the radius of the circle which is tangent to the inner high points of the circular group of pairs of rollers, the convex face having a length of at least substantially the distance between the inner high points of each pair of rollers, the convex face engaging one roller and then engaging a pair of rollers only when the intermediate contacting part of the convex face is equally spaced between the two rollers.

2. A centrifugal clutch comprising a rotary driven member, a circular group of equidistantly spaced rollers mounted upon the member, the circular group extending throughout the periphery of the driven member, the rollers having spaces between them which are defined by a circle tangent to the inner high points of the rollers, the circular group of rollers providing pairs of spaced rollers, a driving rotary member, radially movable cam-weights carried by the driving member, each cam-weight having a circularly curved outer convex face which is slightly eccentric with respect to the circular group of rollers and has a radius less than the radius of the circle which is tangent to the inner high points of the circular group of rollers, the convex face having a length of at least substantially the distance between the inner high points of each pair of rollers, the convex face engaging one roller and then engaging a pair of the rollers at one time only when the intermediate contacting part of the cam weight is equally spaced between the pair of rollers.

3. A centrifugal clutch comprising a rotary driven member and extending throughout the periphery of the driven member and forming pairs of rollers, a circular group of spaced rollers mounted upon the member, a driving rotary member disposed inwardly of the circular group of spaced rollers, radially movable cam-weights carried by the driving member, means to hold each cam-weight from turning upon its axis with relation to the driven member, each cam-weight having a circularly curved outer convex face which is eccentric with respect to the circular group of rollers and has a radius less than the radius of a circle which is tangent to the inner high points of the circular group of rollers, the convex face having a length greater than the distance between the inner high points of each pair of rollers, the convex face engaging one roller and then engaging a pair of rollers only when the intermediate contacting part of the convex face is equally spaced between the two rollers.

4. A centrifugal clutch comprising a rotary driven member, a circular group of spaced rollers mounted upon the member, a driving rotary member disposed inwardly of the circular group of rollers and including radial arms, radially movable cam-weights having radial openings to slidably receive the arms, each cam-weight having a curved outer convex face which is eccentric with respect to the circularly curved group of rollers and has a radius less than the radius of the circle which is tangent to the inner high points of the circular group of rollers, the convex face having a length of at least substantially the distance between the inner high points of each pair of rollers.

5. A centrifugal clutch comprising a rotary driven member, a circular group of spaced rollers mounted upon the member, a driving rotary member disposed inwardly of the circular group of rollers and including radial arms, radially movable cam-weights, each cam-weight having a radial opening equi-distantly spaced from its ends to slidably receive the radial arm, each cam-weight having a curved outer convex face which is eccentric with respect to the circularly curved group of rollers and which has a radius less than the radius of the circle which is tangent to the inner high points of the circular group of rollers, the curved convex face of each cam-weight having a length greater than the distance between the inner high points of each pair of rollers, each cam-weight extending circumferentially beyond each pair of rollers, the ends of the cam-weights being slightly spaced to permit of their inward radial movement and to retain the cam-weights in close relation to the rollers.

WALTER W. EVERTS.